United States Patent [19]

Seitz et al.

[11] 4,156,277
[45] May 22, 1979

[54] ACCESS REQUEST MECHANISM FOR A SERIAL DATA INPUT/OUTPUT SYSTEM

[75] Inventors: Charles L. Seitz, San Luis Rey; Marshall M. Parker, San Diego, both of Calif.

[73] Assignee: Burroughs Corporation, Detroit, Mich.

[21] Appl. No.: 836,846

[22] Filed: Sep. 26, 1977

[51] Int. Cl.$^2$ .................................................. G06F 3/00
[52] U.S. Cl. .................................................. 364/200
[58] Field of Search ... 364/200 MS File, 900 MS File; 179/18 D, 15 AL, 15 BA; 340/147 LP

[56] References Cited

U.S. PATENT DOCUMENTS

| | | | |
|---|---|---|---|
| 3,723,971 | 3/1973 | Betts et al. | 179/15 AL |
| 3,796,994 | 3/1974 | Nuss, Jr. | 340/147 LP |
| 3,985,962 | 10/1976 | Jones et al. | 179/15 AL |
| 3,996,561 | 12/1976 | Kowal et al. | 364/200 |

OTHER PUBLICATIONS

"Rapid Polling for Loops or Multidrop Systems with Priorities"; Piatkowski et. al.–IBM T.D.B. vol. 16, No. 1, Jun. 1973, pp. 306–307.

*Primary Examiner*—Harvey E. Springborn
*Attorney, Agent, or Firm*—Mervyn L. Young; Kevin R. Peterson

[57] ABSTRACT

An I/O data interface provides an access mechanism without requiring additional lines on the bus for device address presentation for the request of access. Each peripheral device can detect an invitation-to-request access signal and in response thereto, to supply its own device address on the bus in a serial manner with any other device requesting access. Respective device addresses are assigned to respective peripheral devices in accordance with their priority, the higher priority devices having a higher address and the lower priority devices having a lower address. If any address bit of a particular device is lower than an address bit on the bus, the device ceases to supply its address bits with the result that only the requesting device having the larger device address will be selected for communication over the I/O bus.

5 Claims, 7 Drawing Figures

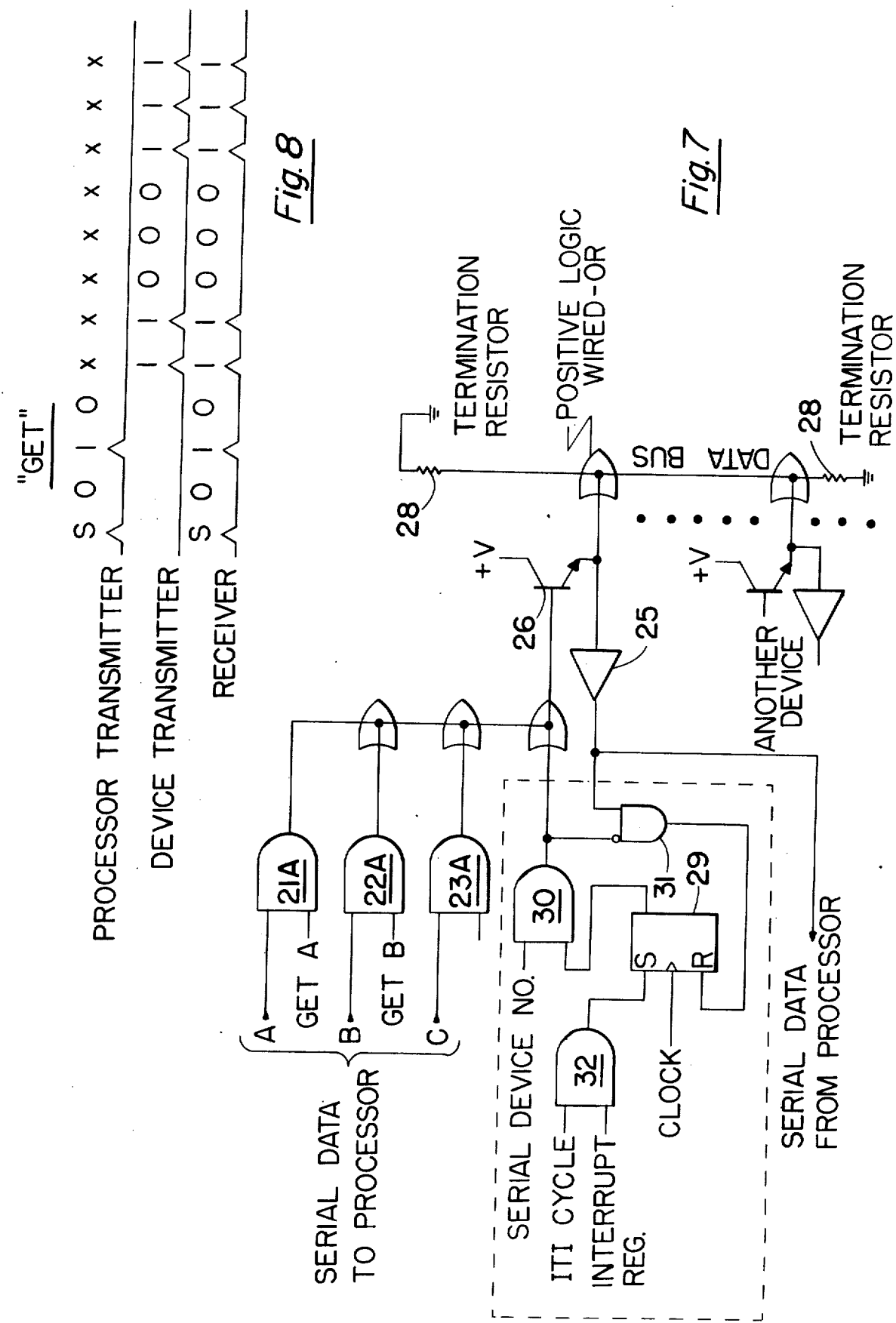

ACCESS REQUEST MECHANISM FOR A SERIAL DATA INPUT/OUTPUT SYSTEM

BACKGROUND OF THE INVENTION

1. Field of the Invention

This invention relates to a serial input/output system applicable to small computers and terminals and more particularly a priority access mechanism for such an input/output system.

2. Description of the Prior Art

A number of different input/output interfaces have been developed for a variety of both high and low speed data processing systems. When the system employs high speed peripheral devices such as magnetic discs and high speed tape drives, data transfer across the interface is ordinarily parallel by byte or by word. The relatively high cost of the large number of parallel conductors required for such an interface is justified by the high data transfer rate that is achieved. Such high speed interfaces usually include extra conductors for device addresses and to handle access or interrupt requests according to the priority of the device requesting access or interrupt. Attached to such a high speed interface may be a peripheral control unit which in turn communicates with slow speed I/O devices such as display units, printers and keyboards. The data communication between the controller and such slow speed devices can be accomplished serially by bit. However, the handling of access or interrupt requests normally requires additional request and device address conductors. Small data processing systems such as employed in small businesses and locations remote from the central processor of larger organizations also sometimes are provided with a slow speed interface to communicate with display devices, keyboards and the like.

Such terminal controller units often service a large number of different types of small I/O devices which require a plurality of different communication lines between the individual devices and the controller. This increases the cost of the controller unit. Furthermore, the controllers often require modification to incorporate anticipated new devices. The general result is a lack of standardization of cables and connectors and the communication discipline.

In order to service all the respective devices, the controller usually polls the unit in a sequence starting with the highest priority device. This type of servicing arrangement provides for rather low data throughput as the polling sequence is fixed such that if a low priority device is requesting service more often than a high priority device, the controller must still repeat the polling sequence.

It is then an object of the present invention to provide an improved input/output system which is low in cost but nevertheless can handle a large number of low-speed input/output devices.

Another object of the present invention is to provide an improved input/output system having an access request mechanism which does not add to the cost of the input/output communication bus.

It is a further object of the invention to provide an inexpensive input/output interface having an access request mechanism for a wide variety of input/output devices.

SUMMARY OF THE INVENTION

In order to accomplish the above described objects, the present invention resides in a serial I/O bus and a plurality of peripheral devices coupled thereto where each device can detect an invitation-to-interrupt or request access instruction or signal and in response thereto to supply its own device address onto the bus in a serial manner in synchronism with any other device requesting interrupt or access. The addresses are supplied to the I/O bus starting with the most significant bit and ending with the least significant bit. Each time the device places an address bit on the bus, it also detects by comparison whether or not another device has placed an address bit on the bus and whether the resulting signal on the bus is higher or greater than the address bit supplied by the device. If it is, the device ceases to supply its address bits with the result that only the requesting device having the largest device address will be selected for communication over the I/O bus. The respective device addresses are assigned to the respective peripheral devices in accordance with their priority, the higher priority devices having a higher address and the lower priority devices having a lower address.

A feature then of the present invention resides in a I/O serial data bus and a plurality of peripheral devices coupled thereto where each device includes a detection circuit to detect an invitation-to-interrupt or request access signal or instruction, an addressing circuit to supply a device address to the I/O bus in a serial manner beginning with the most significant bit of the address, and a comparison circuit to determine whether the address bit currently being supplied to the bus is less than address bits supplied to the bus by another device.

BRIEF DESCRIPTION OF THE DRAWINGS

The above and other objects, advantages and features of the present invention will become more readily apparent from a review of the following specifications when taken in conjunction with the drawings wherein:

FIG. 7 is a schematic diagram of comparison circuitry as employed in the present invention; and FIG. 8 is a set of waveforms illustrating data transmission for alternative embodiments employing transmission other than electrical.

GENERAL DESCRIPTION OF THE SYSTEM

Figure 1:
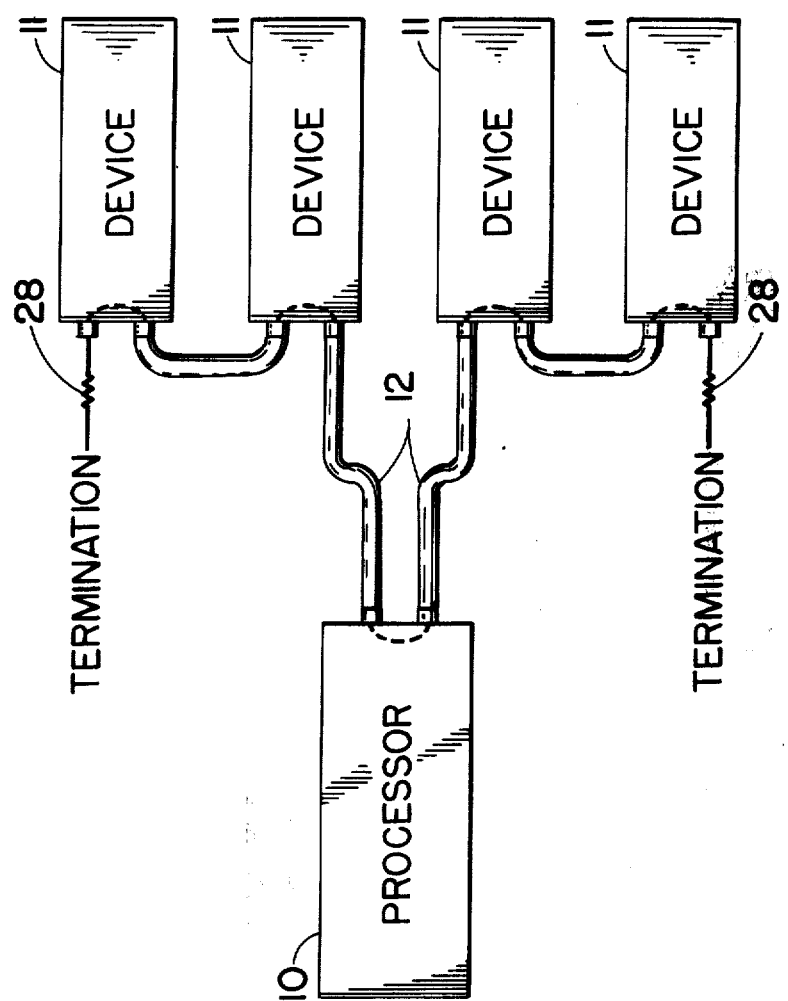
FIG. 1 is a schematic diagram of a system employing the present invention.

A system employing the present invention is illustrated in FIG. 1. As shown therein, processor 10, which may also be a terminal controller, is coupled to a plurality of different I/O devices 11 by way of I/O bus 12 in a chain-like fashion. It will be apreciated that the same electrical connections would be achieved if the system of FIG. 1 were represented with each device 11 and processor 10 being coupled to a common I/O bus illustrated schematically as being outside of the respective units. As indicated above, processor 10 may be a small stand-alone data processor or it may be provided with appropriate communication facilities for communicating with a larger data processing system.

In the present invention, I/O bus 12 of FIG. 1 is a three conductor serial bus which allows communication between the respective units coupled to it including access interrupts. The three conductors required are a clock conductor which carries the clock signal from processor 10 of FIG. 1, a data conductor which is a bi-directional bus line, and a signal ground. In an asynchronous system, the clock conductor may be dispensed with resulting in a two conductor bus. In FIG. 1, each of the devices 11 and processor 10 can supply data signals to bus 12 by combining its respective signals with the signals from bus 12 in a logical OR manner for reasons that will become more apparent below. The quiescent condition of bus 12 is a low voltage level or logical 0 while a positive data signal would be a high or logical 1.

Figure 2:
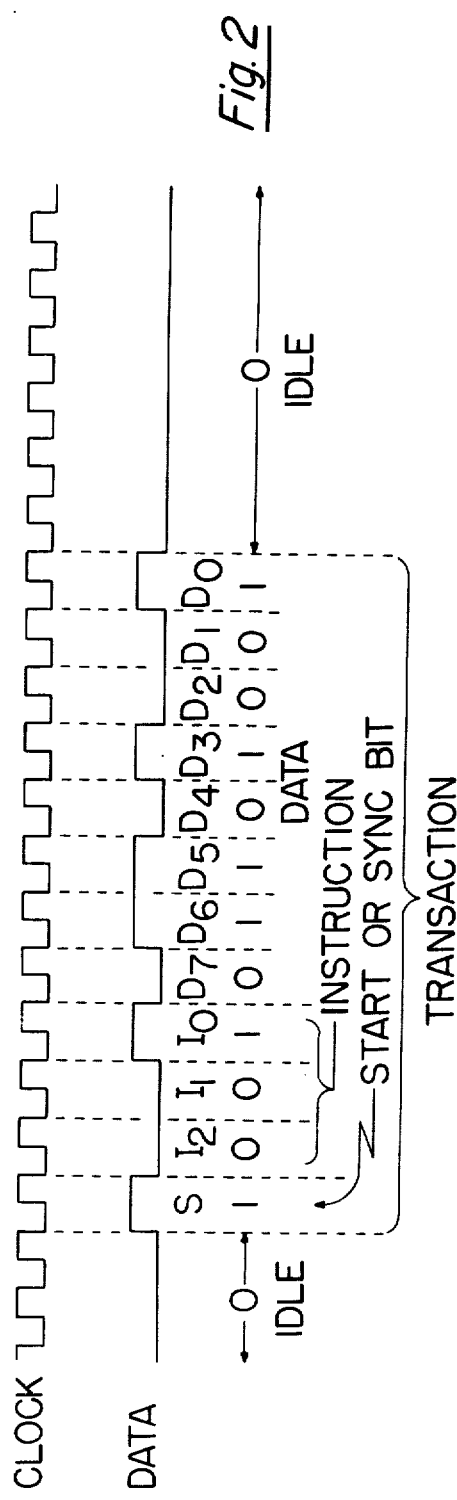
FIG. 2 is a set of waveforms illustrating the data and instruction format as employed in the present invention.

A data segment to be transmitted between the processor and a I/O device is illustrated in FIG. 2 in relation to the synchronous clock signal. This data segment consists of an initial start or sync bit followed by three instruction bits which are then followed by eight data bits. Variations of this format may be employed including variable length prefix codes and the inclusion of error detection or correction providing that the ordering of the set fields is as specified.

The start bit and instruction code are placed on the bus by the processor. The start bit signals the beginning of a transaction and the instruction code specifies the type of operation to be performed. Depending upon the instruction code, the data are placed on the bus either by the processor or by one (or more) devices.

Because there may be many devices attached to one bus, and because they may not be distinguished by their connection order on the bus, it is necessary that each device have a unique identification which is called the device number. For the format of transactions as illustrated in FIG. 2, an eight bit representation is employed for the device number except that no device may be identified by the device number 00000000. The reason for this will become more readily apparent in the description of the interrupt or access mechanism of the present invention. The device numbers range from 1 to 255. The possibility of 255 different devices is normally more than adequate for any small system or terminal controller. Of course, should a larger number of devices be required, the device number and address format can be increased.

Devices which have higher priority in interrupt service are assigned a numerically larger device number in accordance with the interrupt mechanism of the present invention. For example, a keyboard should be assigned a relatively small device number to reflect its low data rate while a magnetic tape unit should be assigned a relatively large device number to assure that it will receive service quickly.

The manner in which the various I/O devices of FIG. 1 request processor interrupt access to handle data transmission from the respective devices will now be discussed. As will be further described below, the processor will periodically issue an INVITATION-TO-INTERRUPT instruction which causes any device desiring data transmission to place its device number on the data line of the I/O bus. As was indicated above, each device places its data including its device number onto the data line by combining its data with data on the data bus according to the logical OR function. It will be remembered in the present invention that the I/O bus is a synchronous bus driven by a clock signal received from the processor. Thus, when an INVITATION-TO-INTERRUPT instruction has been executed, each device requesting service will begin to place its number onto the data line beginning with its highest order bit. Each device requesting service will sense whether its particular bit currently being placed on the data line of the I/O bus is higher than or equal to the other signals currently on the data line during that particular clock period. If so, the device will continue to supply the next highest order bit of its device number. If any device requesting service detects that its device number bit currently being placed on the data line is lower than some other bit also placed on the data line during that clock period, the device will cease sending its device number.

Figure 3:
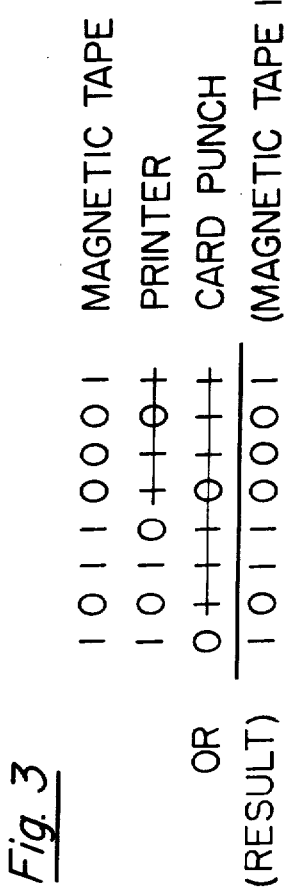
FIG. 3 is an illustration of how the highest priority device requesting service is granted access.

FIG. 3 illustrates the manner in which lower priority devices which are requesting service cease to place their device number onto the data line of the I/O bus with the result that at the end of the INVITATION-TO-INTERRUPT instruction, only that device with the highest priority then requesting service will have placed its device number on the data line. In FIG. 3, a magnetic tape device having a high priority is attempting to request service at the same time as is a printer having a lower priority and a card punch which has even a lower priority. In this example, the device number of the magnetic tape is 10110001, the device number of the printer is 10101101 and the device number of the card punch is 01110111. During the first clock period following the initiation of the INVITATION-TO-INTERRUPT instruction, each of the three devices will place their highest order bit of their device number onto the data line of the I/O bus. The printer and tape device each will recognize that its highest order bit is no lower than any other bit on the data line and will continue to supply the next higher order bit of its device number. However, the card punch will detect that its highest order bit is lower than any bit on the data line and will cease to supply any further bits of its device number. Similarly, during the next two clock periods, the printer and tape device each will detect that the respective bits of its device number are no lower than any other bits placed on the data line and will continue to send the next order bit of its device number. During the fourth clock period, the printer will detect that its fourth highest ordered bit of its device number is lower than other bits on the data line and will cease to send subsequent bits of its device number. The end result is that only the magnetic tape device will transmit its full device number and this will be recognized by the processor.

The various types of instructions including the INVITATION-TO-INTERRUPT will now be discussed again with reference to FIG. 2. The SELECT instruction is provided with an instruction code of 001, followed by the eight-bit device number which causes that device to become selected and all other devices can be deselected. This instruction is then followed by either a GET data or SEND data operations which affect only the selected device.

The INVITATION-TO-INTERRUPT instruction has an instruction code 000. When this instruction code is placed on the data line of the I/O, it is received by all of the devices. As indicated above, if a particular device requires an interrupt, its OR's its own device number onto the data bus, high-order bit first. As was indicated above, if the device senses a logical 1 while it is applying a logical 0, it ceases to apply its own device number. Thus, upon an INVITATION-TO-INTERRUPT instruction, the serial bus acts to compute the numerically largest device number of those devices attempting to interrupt. The manner in which the simultaneous serial comparison is accomplished was discussed above in regard to FIG. 3.

Figure 4:
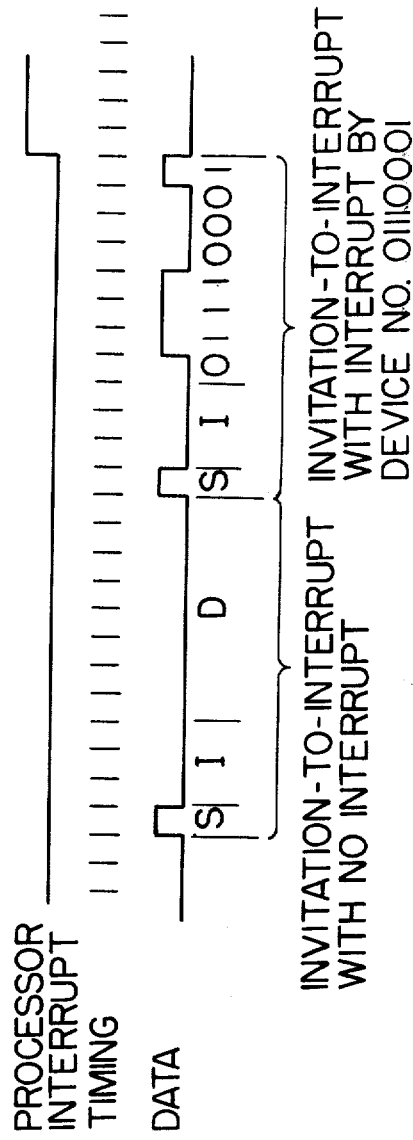
FIG. 4 is a set of waveforms representing the manner in which access requests are received and handled.

If no device is attempting to interrupt, the signal on the bus will be all zeros. Since there may not be a device whose device number is 00000000, (as was described above) the processor may then reissue this instruction either until an interrupt from a device is detected, or until the processor turns off the INVITATION-TO-INTERRUPT instruction execution. This continuous mode of operation is illustrated in FIG. 4.

The code 000 is preferred for INVITATION-TO-INTERRUPT since this is the most common condition on the serial bus when the processor is running. Furthermore, this code combination consumes the least power in the data line drivers and termination. When a device interface has successfully applied its own device code in an INVITATION-TO-INTERRUPT operation, it becomes selected and all other devices are deselected.

Instruction codes 010, 100, and 110 cause the selected device to transmit one of three possible eight-bit fields to the processor by applying this data to the data line of the I/O bus. The use of multiple GET instructions is useful as allowing different types of information to be conveyed, i.e., for a magnetic tape unit, either read data or status information such as "end-of-tape" may be transmitted.

Instruction codes 011, 101, and 111 cause the selected device to receive data from the processor. Again the use of multiple SEND instructions is useful for allowing different types of information to be conveyed, i.e., for a magnetic tape unit, either write data or controls for speed and direction of tape motion.

DETAILED DESCRIPTION OF THE INVENTION

Figure 5:
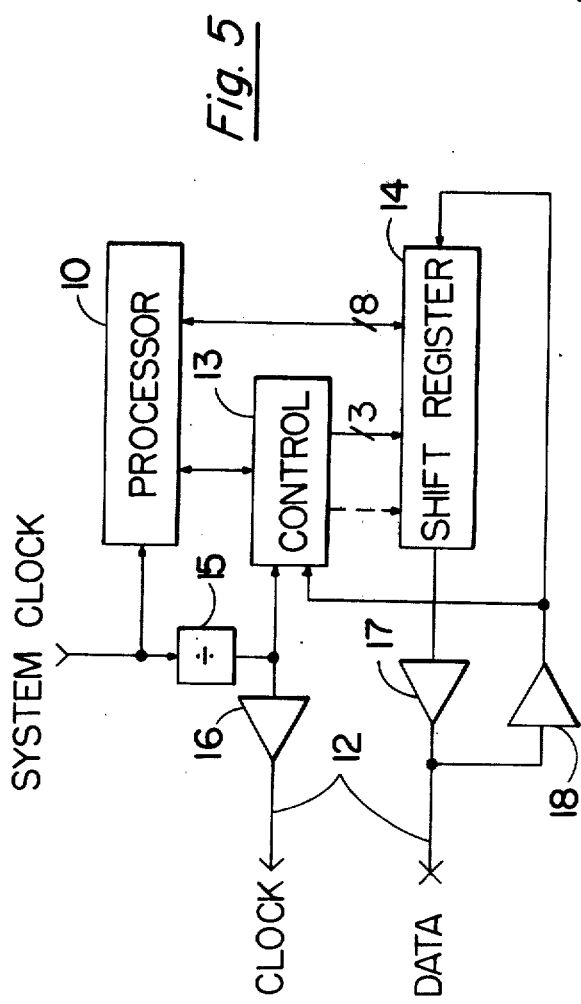
FIG. 5 is a schematic diagram of the transmission circuitry embodied in the terminal controller or processor of the system of FIG. 1.

The processor control structure for receiving and sending data segments is illustrated in FIG. 5. This structure may be embodied within processor 10 itself or may be external to the processor if a commercial microprocessor is employed. Such a microprocessor may be of the type described in the Ferguson, U.S. Pat. No. 3,886,523. The approach of internal control provides a powerful I/O system for a microprocessor while using a minimum of connection pins.

The clock signal supplied to respective I/O devices on the clock line of I/O bus 12 may be derived from counter frequency divider 15 that is driven by the system's clock which also drives processor 10. This avoids any need for synchronization between the processor and the I/O controls. The I/O instructions executed by processor 10 cause control logic 13 to produce the appropriate instruction code which is supplied to shift register 14 and to commence shifting of shift register 14 for twelve times. This starts the transmission of the data segment on the data line of I/O bus 12.

For output-type instructions, SEND and SELECT, the data is also loaded into shift register 14. For input-type instructions, GET, the input data will appear in shift register 14 at the end of the shift cycle and must be transferred into processor 10 by another instruction. INVITATION-TO-INTERRUPT is treated as an output instruction, but can be repeated indefinitely until terminated or until a device places its device number on the data line of I/O bus 12. When such an interrupt occurs, the processor instruction execution is interrupted and it may determine the highest priority interrupting device by reading the data in shift register 14.

A complete set of processor I/O instructions is:
1. INVITATION-TO-INTERRUPT
2. SELECT
3. GET
4. SEND
5. TURN OFF INVITATION-TO-INTERRUPT
6. BRANCH (OR WAIT) IF SHIFT CYCLE IN PROGRESS
7. READ SHIFT REGISTER DATA The first four of these instructions translate into immediate action by control logic 13. The instruction to turn off the INVITATION-TO-INTERRUPT repetition is required in the event of non-interrupt initiated I/O activity, and must be followed by a wait for the current cycle to complete. Similarly, following a GET type of instruction, the processor must wait until the shift cycle is complete before reading data from shift register 14.

In FIG. 5, line drivers 16 and 17 and line receiver 18 are provided as would be understood by one skilled in the art.

Figure 6:
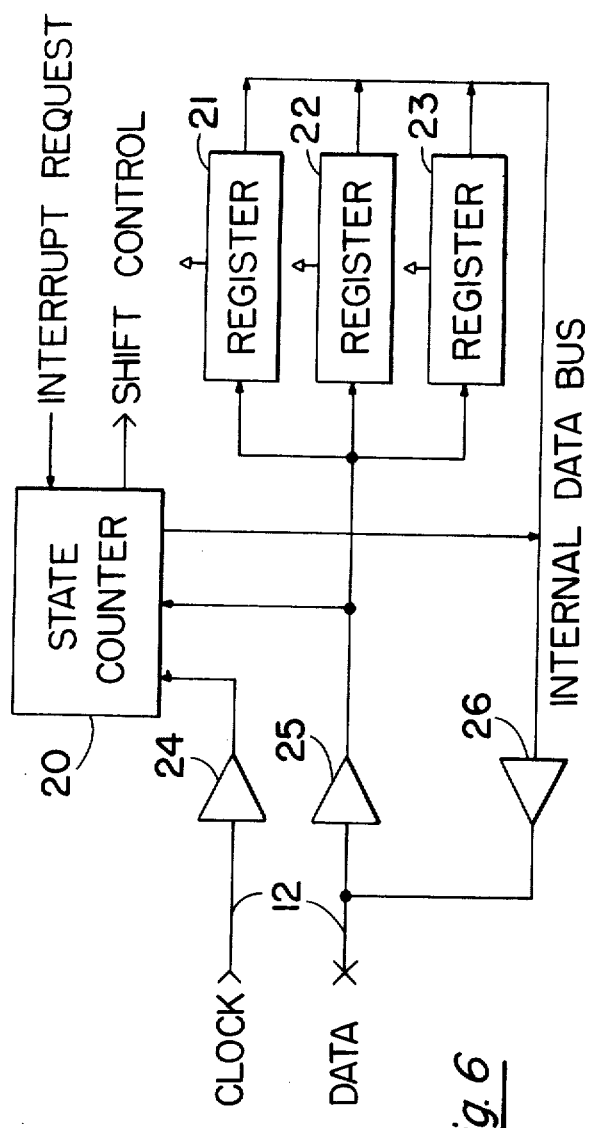
FIG. 6 is a schematic diagram of the transmission circuitry as employed in each of the input/output devices of the present invention.

The I/O circuitry for controlling the reception and transmission of data by one of the I/O devices is illustrated in FIG. 6. It is preferable that this circuitry be incorporated as a single integrated circuit with the device control in order to minimize the number of pins and interconnections required. State counter 20 may be of a type described in the above referenced Ferguson et al patent and is a state machine which examines the data line of I/O bus 12 in order to detect the start of a transaction, the instruction code, and the select data. State counter 20 also controls the shifting of data into and out of internal registers 21, 22 and 23. State counter 20 is also responsive to interrupt requests in order to apply its own device code to the data line of I/O bus 12. State machine 20 will generally have less than 64 states, only two inputs, and includes a number of outputs which number is variable depending on the complexity of the device. It can accordingly be implemented readily with a read-only storage device (not shown) of 256 words of n+6 bits per word where n is the number of output control lines required, and a six-bit register clocked by the clock signal. Line drivers and receivers 24, 25 and 26 are of conventional design and are used as shown in the device connections to serial I/O bus 12.

The comparison circuitry which implements the interrupt mechanism of the present invention is illustrated in FIG. 7. This circuitry is preferably implemented as a part of state counter 20 of FIG. 6. Thus, emitter-follower 26 of FIG. 7 is the same as line driver 26 of FIG. 6. Similarly, line receiver 25 of FIG. 7 is the same as line receiver 25 of FIG. 6. Gates 21A, 22A and 23A of FIG. 7 are employed to gate data segments out of the respective registers 21, 22 and 23 of FIG. 6.

Emitter-follower 26 drives the data line of the I/O bus. The respective line drivers 26 of all of the devices and terminating resistors 28 form a positive logic wired OR function. Serial data being sent from the individual device to the processor is gated by control lines decoding the instruction bits onto the data bus. Serial data from the processor to the individual devices is available to the individual devices as sensed by line receiver 25 which is an amplifier.

When an ITI (INVITATION-TO-INTERRUPT) cycle is decoded and the individual device is requesting an interrupt, corresponding signals are gated via AND gate 32 to set comparison flip-flop 29 at the beginning of the data interval of the transaction. When flip-flop 29 is set, the serial device number is gated through AND gate 30 to be combined with other data on the data line of the I/O bus in accordance with the logical OR function. However, if the serial device number for that particular significant bit is 0 but the data on the data line during that particular clock period is 1, this condition is detected by AND gate 31 causing comparison flip-flop 29 to be reset for the rest of the data interval of the transaction. This causes the device to defer its interrupt request to the interrupt request of a higher priority device.

The embodiment of the present invention as thus disclosed is directed toward the employment of synchronous digital transmission. However, as was indicated above the present invention can also be employed with asynchronous transmission. If some particular frequency for the clock signal were chosen and reproduced sufficiently precisely in each device, it would clearly be possible to reconstruct the phase of the clock signal from the start or sync bit of each data transaction. In this case, it would not be necessary to convey the clock signal to the device and the I/O system would require only two wires as a practical minimun. Furthermore, if other forms of data transmission than purely electrical were employed, reduction to a single signal channel would be practical for communication between the processor and individual devices. Thus, the present invention can be employed with radio, optical or sonic transmission modes.

When radio communication is employed, for example, the logic signals can be transmitted as a short pulse envelope at a particular radio frequency, or its absence. FIG. 8 illustrates the waveforms for such transmission for the GET instruction. Receipt of the start pulse would synchronize a clock in the device so that it may decode the instruction part, and then transmit the required data to the processor in a proper time relationship. An electromagnetic or sonic media of signal propagation readily provides the logical OR function required for the operation of the priority interrupt mechanism of the present invention. Such forms of transmission other than electrical have certain advantages, including convenience and safe ground isolation.

The frequency of the clock signal, whether conveyed directly to the device or reconstructed at the device, determines the practical limit on the length of cabling or distance due to signal propagation delays. The clock frequency also determines the I/O throughout performance that can be achieved. Frequencies around 1MHz for the clock seem to be a reasonable compromise for electrical transmission as this frequency allows the devices to be located up to several hundred feet away from the processor and will support data rates of several thousand characters per second. Clock frequencies around 10MHz allow performance comparable to the conventional parallel I/O bus with a distance limitation for electromagnetic propagation of several tens of feet.

EPILOGUE

A low-cost serial bus interface for I/O data transfers has been disclosed which provides an interrupt mechanism without requiring additional lines on the bus for device address presentation or the granting of interrupt priority. Each peripheral device can detect an invitation-to-interrupt instruction and in response thereto, to supply its own device address on the bus in a serial manner in synchronism with any other device requesting interrupt. Respective device addresses are assigned to respective peripheral devices in accordance with their priority, the higher priority devices having a higher address and the lower priority devices having a lower address. The addresses are supplied to the I/O bus starting with the most significant bit and ending with the least significant bit. Each time the device places an address bit on the bus, it also detects whether or not another device has placed an address bit on the bus and whether the resulting signal on the bus is higher or greater than the address bit supplied by the device. If it is, the device ceases to supply its address bits with the result that only the requesting device having the larger device address will be selected for communication over the I/O bus.

While only one embodiment of the present invention has been disclosed, it will be apparent to those skilled in the are that variations and modifications may be made therein without departing from the spirit and the scope of the invention as claimed.

What is claimed is:

1. A data transfer system for transfer of data and other information to or from one of a plurality of input-/output devices, said system comprising:
    a serial input/output bus;
    signal means coupled to said bus to provide an initiating signal thereon; and
    a plurality of input/output devices coupled to said bus, each of said devices including first means to detect an initiating signal placed on said serial bus, second means to supply device address bits to said bus, highest order first, in response to said initiating signal, and comparison means to detect when an address bit signal supplied to said bus from another device is greater than the device address bit being supplied to said bus from the current device and to stop further supply of address bits from said current device.

2. A system according to claim 1 wherein said data transfer is asynchronous and wherein:
    each of said devices includes clock means to generate a clock signal for said device when initiated by the detection of said initiating signal.

3. A system according to claim 1 wherein said data transfer is synchronous and wherein:
    said input/output bus includes a clock channel to provide clock signals to said devices.

4. A system according to claim 1 wherein:
    said signal means resides in one of said devices.

5. A system according to claim 1 further including:
    a processor coupled to said bus and including said signal means.

* * * * *